May 19, 1931. P. ROBINSON 1,806,310
RECOVERY OF METALS
Filed Feb. 16, 1928
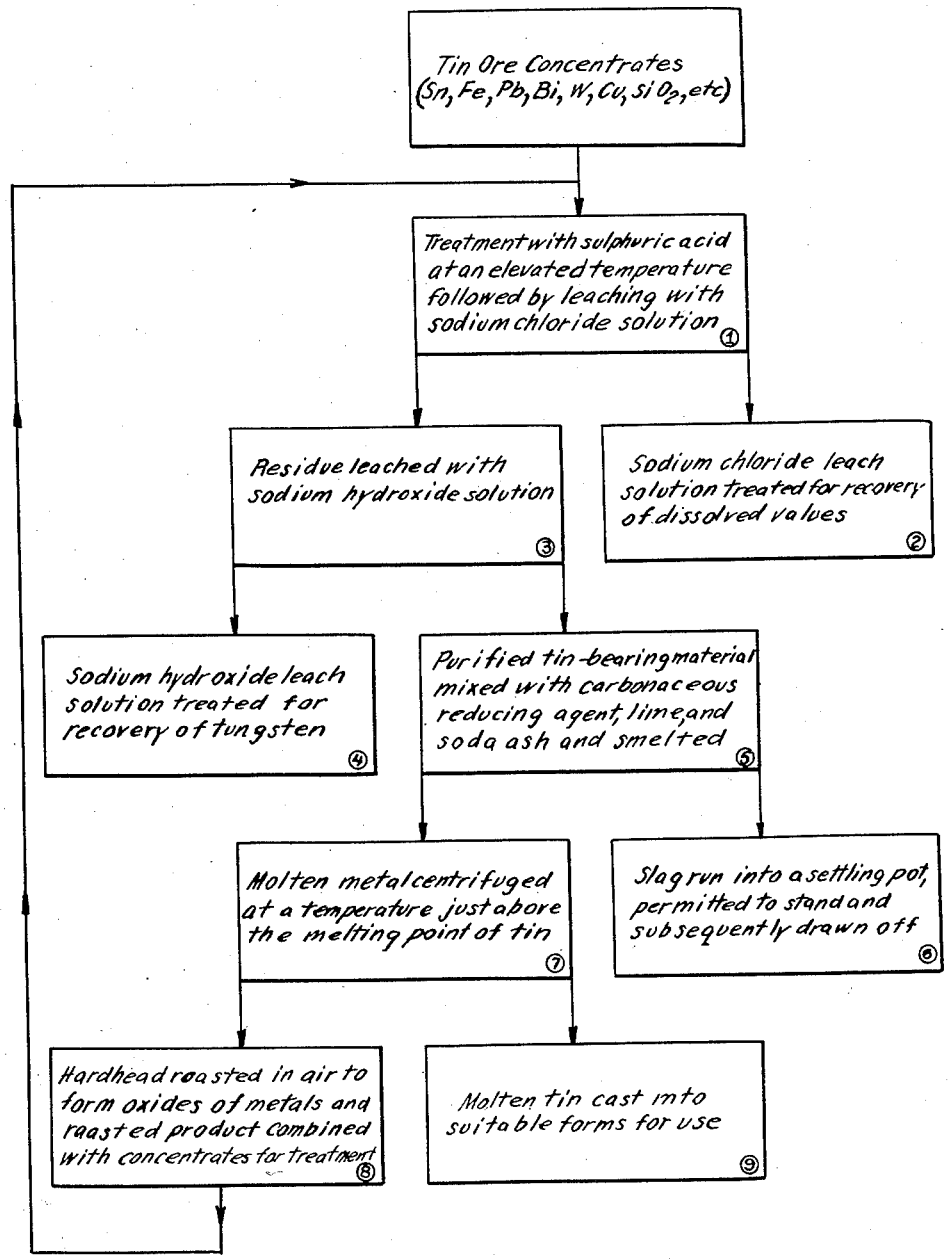
INVENTOR
PRESTON ROBINSON
BY
Pennie, Davis, Marvin & Edmonds
ATTORNEYS Patented May 19, 1931

1,806,310

UNITED STATES PATENT OFFICE

PRESTON ROBINSON, OF NEW YORK, N. Y., ASSIGNOR TO GUGGENHEIM BROTHERS, OF NEW YORK, N. Y., A COPARTNERSHIP

RECOVERY OF METALS

Application filed February 16, 1928. Serial No. 254,888.

This invention relates to the treatment of tin ores, concentrates, and other tin-bearing materials, and has for its object the provision of an improved method of treating tin-bearing materials for the production of metallic tin of relatively high purity as well as the recovery in marketable form of the other valuable metals in the tin-bearing material.

Complex tin ores, and in particular lode ores of the cassiterite type, and their concentrates, frequently, and indeed usually, contain iron (Fe), tungsten (W), bismuth (Bi), antimony (Sb), lead (Pb), copper (Cu), zinc (Zn), silver (Ag), aluminum (Al), arsenic (As), barium (Ba), phosphorus (P), sulfur (S), silicon (Si), and the like. The iron occurs for the most part as pyrite, wolframite and in complex silicates. It is a very common and troublesome contaminant in tin ores. The tungsten probably occurs as the mineral wolframite. The remaining impurities are present more or less as oxides and native sulfides. In addition, such complex tin ores are further complicated by the presence of certain complex silicates, such as biotite and tourmaline. These complex silicates are generally composed of various combinations of silicon with other elements, such, for example, as iron, manganese, titanium, aluminum, and tungsten.

In some of the present customary methods of tin smelting, the tin ore, or its tin-bearing concentrate, is, without preparatory metallurgical treatment, subjected to the smelting operation. In this smelting operation, a considerable part of the tin is lost in the slag, and a further considerable part of the tin goes into a metallic alloy (with iron, tungsten etc.) known in the industry as hardhead, while such metallic tin as is produced by the operation is relatively impure and must be subjected to a subsequent refining treatment, such for example as electrolysis, poling, etc. The iron in the smelting charge goes into the slag where it exercises the deleterious influence of drawing or attracting tin from the charge, thereby not only causing an objectionable loss of tin but forming complex iron-tin silicates which have a particularly corrosive action on the furnace lining. Moreover, the complex silicates and tungstates present tend to lower the sintering temperature of the charge and thereby impair effective reduction of the tin compounds. A further loss of tin occurs in the flue dust resulting from the smelting operation, so that the ultimate yield of metallic tin, even of a relatively impure grade, is considerably less than should be expected in commercial practice. In addition to these difficulties, the present practices of tin smelting require excessively long periods of time, and multi-stage smelting operations are generally necessary to avoid undue losses of tin.

The present invention in its complete aspect contemplates an improved method of recovering tin from tin-bearing materials involving the treatment of the material in two stages, the first of which is a preparatory purification treatment and the second of which is a smelting operation. The preparatory purification of the tin-bearing material is preferably conducted so as to produce a purified tin product capable of forming a tin-smelting charge having a relatively high sintering temperature from which substantially pure metallic tin can be obtained by direct smelting with the production of a substantially non-ferruginous neutral slag of good fluidity.

Thus, in accordance with the invention, the raw tin-bearing material is first subjected to a preparatory purification treatment in the course of which the objectionable impurities (with respect to tin-smelting) are in very large part eliminated and, where valuable, substantially recovered in marketable forms. In this preparatory purification treatment, the complex silicates and tungstates are so broken up or modified that the resultant purified material has a relatively high sintering temperature in the subsequent smelting operation. Moreover, the purified tin-bearing material is of such character that when subjected with appropriate fluxing agents to a smelting operation, a substantially non-ferruginous slag is obtained, thereby avoiding loss of tin in the slag and undue corrosion of the furnace lining. In this smelting operation a very small amount of hardhead is formed and very little tin is lost in the slag and a high recovery of metallic tin of high purity is obtained. Furthermore, the rate of reduction of the tin compounds is considerably more rapid than in the heretofore customary practices and hence the time of smelting is materially reduced.

The preparatory purification treatment may be advantageously carried out by treating the impure tin-bearing material with an appropriate acid, such as sulfuric, phosphoric, nitric, hydrochloric, or the like, or mixtures of such acids, at an elevated temperature, preferably in excess of 100° C., for a sufficient length of time to convert the objectionable impurities into compounds that may be separated from the tin-bearing material by leaching. Following this acid treatment at elevated temperature, the tin-bearing material is cooled and successively leached, preferably at atmospheric temperature, with salt and alkali solution such, for example, as sodium chloride and sodium hydroxide solutions, to extract compounds of lead, iron, bismuth, copper, arsenic, silver, tungsten, antimony and the like. The resulting purified tin-bearing material is then dried and subjected to appropriate treatment for the recovery of its tin content, as by smelting or gaseous reduction.

The leach liquors obtained from leaching the acid-treated tin-bearing material with sodium chloride are appropriately treated to recover the valuable metals contained therein. Thus, the leached liquors may be diluted with water to precipitate certain of the metals, such as silver, bismuth and lead, as silver chloride (AgCl), bismuth oxychloride (BiOCl), and lead sulfate ($PbSO_4$), and a small amount of tin which may have been present in soluble form in the raw tin-bearing material or in the hardhead or flue dust subjected to the acid treatment. This metal-containing precipitate may be appropriately treated for the recovery of its valuable metal contents.

The sodium hydroxide leach liquor may be treated by known methods to recover tungsten therefrom. For example, the liquor, which contains an excess of alkali, may be neutralized with an acid, such as hydrochloric acid, and the tungsten may then be precipitated with ferrous chloride ($FeCl_2$) to form ferrous tungstate ($FeWO_4$).

The tin-bearing material should be finely ground or crushed prior to the preparatory purification treatment. Tin concentrates are by reason of their relatively fine state of subdivision favorably conditioned for this treatment.

Hardhead, when subjected to the preparatory purification treatment of the invention, is first roasted at a temperature of approximately 500–800° C., in the presence of air for a sufficient length of time to render the resultant tin oxide insoluble in the leaching liquors after the sulfuric acid treatment. At the same time, the iron in the hardhead is oxidized to the ferric state, but since too high a temperature and too long a time of treatment decreases the solubility of the iron, care should be taken to keep the oxidized iron in a soluble condition so that it will be removed in the subsequent leaching step. The tungsten present in the hardhead is oxidized during the roasting operation to tungstic oxide, while any sulfur and arsenic present in the hardhead are removed as volatile oxides, which may, if desired, be appropriately recovered.

Flue dust obtained from tin smelting operations may also be subjected to the preparatory purification treatment of the invention. The flue dust is preferably mixed and roasted with the hardhead. In this manner, a single roasting operation serves to condition both hardhead and flue dust for the preparatory purification treatment of the invention.

The purified tin-bearing material is now ready for the tin-recovery operation. In accordance with my preferred practice, the material is mixed, without drying, with fluxing agents of appropriate composition and amount and with carbonaceous reducing agent and briquetted, with the aid, if necessary, of an appropriate binder, such as molasses, sulfite waste liquor, or the like. The briquettes are then appropriately dried and smelted in an electric furnace of the slag-resistance type. The smelting temperature is around 1200° C., and the character of the tin-bearing material and the amount and composition of the fluxing agents are such that a non-ferruginous slag of good fluidity is formed at a temperature slightly in excess of 1100° C. In this smelting operation a relatively small amount of hardhead is formed, while a very satisfactory recovery of metallic tin of high purity is obtained.

The preparatory purification treatment of the invention materially raises the sintering temperature of the purified tin-bearing material with respect to the raw tin-bearing material. This raising of the sintering point of the tin-bearing material is believed to be largely effected by the purification procedure itself and perhaps to a smaller extent by the removal of the impurities. The action seems to be largely due to the breaking up or modification of the complex silicates and tungstates present in the tin-bearing material. As a consequence of the raising of the sintering temperature of the tin-bearing material, the smelting charge remains porous and permits substantially complete reduction of the tin compounds before any sintering or fusion takes place to decrease the surface of the tin compounds exposed to the reducing gases. This condition favors economic utilization of the reducing agent, since maximum converson of carbon monoxide to carbon dioxide is thereby obtained compatabile with equilibrium conditions, and, in the case of electric smelting, lower power consumption becomes possible.

Tin smelting operations are best carried on with slags of relatively high fluidity, because the metal to be recovered separates more readily from such a slag. A mobile slag, moreover, is easily removed from the reduction chamber and does not tend to clog the reduction apparatus. The presence of iron in the slag tends to give the slag high fluidity. However, fluidity obtained in that manner is objectionable for the reason that the iron attracts considerable tin to the slag, with an attendant high loss of tin. Under ordinary conditions of tin smelting, if the iron is removed from the tin-bearing material prior to smelting, the slag will be viscous and pasty.

In accordance with the preparatory purification treatment of the present invention, substantially all of the iron compounds are removed from the tin-bearing material before the smelting operation. Hence, under ordinary tin-smelting conditions, the resulting slag would be viscous and pasty. However, the present invention contemplates the provision of certain substitutes for the iron which will give the slag high fluidity and which will, moreover, exert certain other desirable features on the smelting operation, without having any of the bad features of the iron. The slag will be neutral. Its weight will be materially less than that heretofore obtained, and its composition will be such as to greatly speed up the action of reduction.

Fluxing materials, such as alkalies and alkaline-earths, added to the tin smelting charge in appropriate proportions, will give the resultant slag in the smelting operation high fluidity, in the absence of appreciable amounts of iron compounds. This condition may be obtained by the addition of proper relative amounts of $Na_2O$ (sodium oxide) and $CaO$ (calcium oxide), preferably in the form of soda ash and lime, to the charge. The relative amounts of soda ash and lime to be added to the smelting charge are dependent upon, and influenced by, various factors, such as the complex nature of the various ingredients present in the charge, the temperatures to be employed, etc. In order to determine the approximate amounts and relative proportions of $Na_2O$ and $CaO$ for the purpose, recourse may be had to curves obtained when plotting fusion temperatures of various mixtures of sodium silicate ($Na_2SiO_3$) and calcium silicate ($CaSiO_3$). Two eutectic points are determined in this manner, one at about 1120°C. (with about 27 mol. % of $Na_2SiO_3$ and about 73 mol. % of $CaSiO_3$); and the other at about 930° C. (with about 80 mol. % of $Na_2SiO_3$ and about 20 mol. % of $CaSiO_3$). Since the fusion temperatures for amounts of $Na_2SiO_3$ slightly less or greater than in the first eutectic (1120° C.) are not much larger than 1120° C., a slight deficiency or excess of $Na_2O$ may be employed without making a much higher temperature of fusion necessary. Since the temperature necessary to obtain the second eutectic (930° C.) is very much lower than that of the first eutectic, it follows that a temperature closely approximating the latter (1120° C.) is to be preferred in the tin smelting operation because it insures a more rapid reduction of the tin compounds. Other factors being equal, the higher the temperature the more rapid the rate of reduction. Moreover, with the use of a temperature around 1120° C., a minimum amount of $Na_2O$ may be employed to obtain a fluid slag. This is economically desirable for the reason that $Na_2O$, usually in the form of soda ash, is comparatively expensive.

The presence of $Na_2O$ and $CaO$ in proper proportions to the silica in the tin smelting charge not only gives the resulting slag high fluidity, but also tends to make the slag neutral or non-reactive. Sufficient amounts are added to make the slag neutral. This is desirable for the reason that a neutral slag has less tendency to hold tin as compounds than does an acid or basic slag. If the slag is basic, stannates will form and they exert a corrosive action on the furnace lining. In the case of an acid slag, tin silicates will form and these also corrode the lining.

On the whole, it is preferable to obtain neutral slags and employ a neutral furnace lining. If a basic or acid lining is employed, it will react with tin in the charge to form stannates or tin silicates just as in the case of basic and acid slags, which also exert a corrosive action on the rest of the lining.

The improvements of the present invention also enable the tin smelting operation to be conducted with the formation of a smaller amount of slag than heretofore obtained. This is desirable for the reason that since the smelting operation may be conducted with the formation of less slag there is a correspondingly less opportunity for loss of tin in the slag. The loss of tin in slag is a function of the weight of the slag. A saving of tin is thereby effected. It is of course obvious that with less slag, the metallurgical operation may be conducted more efficiently and rapidly.

An important factor in reduction operations is the speed at which the reaction takes place. In the practice of the present invention the purified tin-bearing material can be reduced in about 1 hour, whereas it requires 3 to 6 hours to effect the reduction in the same type of furnace of the unpurified tin-bearing material with fluxes of the kind generally employed, such as lime or lime and fluorspar. I believe this acceleration is largely due to the catalytic action of the $Na_2O$ present in the charge as a fluxing agent. At temperatures approaching reduction of the tin compounds, the $Na_2O$ is reduced by the carbonaceous reducing agent to form metallic sodium:—

$$Na_2O + C = 2Na + CO$$

This free sodium in turn is very reactive and promptly combines with the tin oxide in the charge to form metallic tin:—

$$4Na + SnO_2 = Sn + 2Na_2O$$

The main reducing reaction is also in part speeded up by the fact that the sintering point of the tin-bearing material is materially raised by the breaking up or modification of complex silicates as a result of the preparatory purification treatment. With these silicates broken up or modified, the carbon monoxide gas in the reduction chamber has relatively easy access to the tin compounds to reduce the same to metallic tin:—

$$SnO_2 + 2CO = Sn + 2CO_2$$

Electric furnaces of the slag bath type or of the high frequency induction type have proved particularly adaptable for reducing or smelting the purified tin-bearing material. On the other hand, any type of reduction furnace in which sufficient heat can be supplied to effect the reducing operation will be found adequate for the smelting or reduction of the purified tin-bearing material. While the reduction or smelting operation may be conducted on batches of charge material, the use of purified materials in the manner indicated makes the practice of the invention peculiarly adapted to continuous operation. Molten slag and metal may be separately withdrawn as fresh charge material is introduced into the furnace. A slag of very low metal content and a minimum amount of hardhead will result. The slag will be substantially non-ferruginous. A maximum separation of tin from hardhead may be obtained by centrifuging the molten metal mixture at a temperature slightly above the melting point of tin.

The raising of the sintering point of the tin-bearing material is particularly advantageous in gaseous reduction processes, because the tin compounds present may be reduced to molten tin metal before decreasing the active surface of the tin-bearing material by sintering. Prevention of sintering also obviates other difficulties encountered in gaseous reduction processes, such as clogging of the reduction apparatus. The practice of the invention is particularly applicable in conjunction with the gaseous reduction process described in United States Patent No. 1,620,580 of E. A. Cappelen Smith.

The essential details of my preferred mode of practicing the present invention will, it is believed, be better understood from a consideration of the accompanying flowsheet in conjunction with the following description of the treatment of a representative charge of tin-bearing material in accordance with the principles of the invention. Numerals are used to designate the various main steps or operations of the process. Each succeeding paragraph describing the various steps or operations is numbered to correspond with numbers in the boxes on the accompanying flowsheet which indicate similar steps or operations.

It will of course be understood that the following detailed description and the accompanying flowsheet are provided for purposes of illustration only, and they are not restrictive of the invention.

(1) 148 lbs. of a blend of unpurified Bolivian tin ore concentrates, assaying as follows:—

| | Per cent |
|---|---|
| Sn | 60.0 |
| Fe | 4.55 |
| S | 0.845 |
| Pb | 0.216 |
| Bi | 0.326 |
| W | 1.69 |
| Cu | 0.031 |
| $SiO_2$ | 4.77 |
| As | 0.383 |
| Sb | 0.037 | and crushed so that 85% passed through a 200 mesh screen, were agitated with 272 lbs. of 66° Bé. sulfuric acid for 6 hours at 200° C. in an iron kettle. The mixture was filtered hot on a porous silica plate filter, removing 139 lbs. excess sulfuric acid. The cooled filter cake was then agitated vigorously for 2.5 hours in a wooden tank with 264 lbs. of a 20% sodium chloride solution, filtered and washed on the filter with 77 lbs. of water, again agitated for 1.25 hours with 132 lbs. of 20% sodium chloride solution, filtered, and again agitated for 1.25 hours with 132 lbs. of 20% sodium chloride solution containing 5.2 lbs. of 20° Bé. commercial hydrochloric acid, filtered and washed three times on the filter with 77 lbs. of water.

(2) The combined sodium chloride leach solutions and washes (from 1 above) are treated for the recovery of dissolved values by known methods. In this particular run all of the bismuth was precipitated by bringing the solution into contact successively with scrap iron and iron sulfide. In other runs, the bismuth was recovered as bismuth oxychloride by diluting the solution with water.

(3) The partially purified concentrate (from 1 above) containing about 8% moisture was agitated for 2.25 hours with 132 lbs. of 4.2% sodium hydroxide solution, filtered and washed 3 times with 47 lbs. of water. This completed the purification of the tin-bearing material.

(4) The sodium hydroxide leach solution (from 3 above) assayed as follows:

| | Grams per liter |
|---|---|
| Sn | 0.02 |
| W | 13.05 |
| $SiO_2$ | 1.19 |
| Pb | 0.002 |
| NaOH | 35.5 |

This solution and the immediately following washes were treated for the precipitation of tungsten as calcium tungstate by neutralizing with hydrochloric acid and adding calcium chloride in accordance with well known practice.

(5) The purified concentrate from 3 above was dried and assayed. The results of this assay and the composition of the raw concentrate are given below for comparison:

| | Raw concentrate | Purified concentrate | Extraction |
|---|---|---|---|
| | Per cent | Per cent | Per cent |
| Sn | 60.0 | 68.08 | |
| Fe | 4.55 | 1.22 | 76. |
| S | 0.845 | 0.67 | 30. |
| Pb | 0.216 | 0.035 | 86. |
| Bi | 0.326 | 0.003 | 99. |
| W | 1.69 | 0.08 | 96. |
| Cu | 0.031 | 0.005 | 98. |
| $SiO_2$ | 4.77 | 4.82 | 8.5 |
| As | 0.383 | 0.058 | 87. |
| Sb | 0.037 | 0.000 | 100. |

The purified concentrate was mixed with 0.17 lbs. of minus 14 mesh coal per pound of tin in the concentrate; and 0.7 lbs. of lime and 0.5 lbs. of soda ash per pound of silica in the charge for fluxes. To the above mixture 4% by weight on the concentrate of a coal tar pitch was added and the whole charge thoroughly mixed and made into briquettes. The quantities of fluxes indicated are so proportioned as to form an eutectic of $Na_2SiO_3$ and $CaSiO_3$. This combination of $Na_2SiO_3$ and $CaSiO_3$ has been found to give a fluid slag even when as much as 20% of alumina ($Al_2O_3$) is present in the slag. The briquettes were then charged into an electric smelting furnace of the slag resistance type, smelted continuously and the slag and metal tapped in the usual manner. The time for reduction was about 1 hour. The heretofore customary practice of reducing the unpurified concentrates with the usual fluxes in a reverberatory furnace requires a very considerably longer time.

(6) The molten slag (from 5 above) was run into a settling pot, and after standing for 4 hours at approximately 1250° C. the slag was drawn off. It assayed 0.5% tin. This slag is substantially non-ferruginous. The slag obtained in the more customary practices of smelting unpurified tin concentrates in a reverberatory furnace contains from 15-25% iron, while the slag obtained in the practice of the present invention contains but 2 to 4% iron—depending on the amount of iron present in the purified tin concentrate.

(7) The molten metal (from 5 above) was allowed to cool to above 300°C., and was then centrifuged in an iron centrifugal heated just above the melting point of tin. This centrifuging operation quite effectively separated the substantially pure molten tin metal from the iron-tungsten-tin alloy, generally referred to as hardhead.

(8) The solid alloy metal or hardhead (from 7 above) was then roasted in air for two to four hours at 600-800° C. in order to convert the metals into oxides and to render the tin oxide formed insoluble, but at the same time to render the oxides of iron and tungsten soluble in the leaching solution used to purify the tin-bearing material. This roasted hardhead was then mixed with fresh tin concentrates to be purified as described under (1) above.

(9) The molten tin (from 7 above), obtained by the centrifugal operation, is cast into pigs or ingots to be subsequently used as desired. This final tin metal was substantially pure on analysis. It showed that only very minute traces of other metals were present. The analysis was as follows:

| | Per cent |
|---|---|
| Bi | 0.005 |
| Pb | 0.052 |
| Cu | 0.007 |
| As | 0.085 |
| Sb | 0.000 |
| Sn (by difference) | 99.851 |

To further illustrate the advantages of purifying the tin concentrates in preparation for the smelting operation, the following example is given: The unpurified tin concentrate assaying 11.5% iron was treated with 380 lbs. of 60° Bé. sulfuric acid for each 1000 lbs. of tin concentrate. The so-treated material was leached as hereinbefore described, and a purified concentrate assaying 1.33% Fe was obtained. This purified concentrate was smelted as hereinbefore described, and a final tin product equivalent in purity to that in the aforementioned example resulted. If, on the other hand, a charge of this same tin concentrate, in its unpurified state, is directly subjected to a smelting operation, only slag and hardhead are formed, and all of the available tin finds its way into the slag and hardhead.

The process of the invention is adaptable to tin concentrates regardless of previous treatment. Thus, with a roasted, weathered or oxidized concentrate satisfactory results are obtained by treatment with 60° Bé. sulfric acid at 150° C., while unroasted, floated, or raw concentrates give superior results when treated with 66° Bé. sulfuric acid at 200° C.

While heating the concentrates mixed with a large excess of $H_2SO_4$ to give a fluid pulp has proved satisfactory, if desired, a quite thick mixture of concentrates and sulfuric acid may be heated in a commercial type of mixer at the proper temperature and satisfactory results will likewise be obtained.

If it is desired to remove barium sulfate from the concentrates, which is deleterious to the smelting operation, oleum may be added to the fluid pulp when using a large excess of sulfuric acid to increase the solubility of the barium sulfate. This barium sulfate in solution may subsequently be precipitated from the sulfuric acid filtrate by adding water in the form of more dilute sulfuric acid until a composition is reached at which barium sulfate is relatively insoluble.

I claim:

1. The method of recovering tin from tin-bearing material containing tungsten compounds which comprises eliminating substantially all of the tungsten from the material by treating the material successively with acid and alkaline solutions, and subjecting the material thus substantially freed of tungsten to a reducing operation in which a higher recovery of tin is directly effected as a consequence of the tungsten elimination.

2. The method of recovering tin from tin-bearing material which comprises conditioning the material for smelting by a preparatory purification treatment, and smelting the so purified tin-bearing material in the presence of a carbonaceous reducing agent and appropriate relative proportions of alkali and alkaline-earth fluxing agents to yield a substantially non-ferruginous slag of high fluidity and thereby obtaining a relatively high yield of tin metal.

3. The method of recovering tin from tin-bearing material which comprises conditioning the material for smelting by a preparatory purification treatment, and smelting the so purified tin-bearing material in the presence of a carbonaceous reducing agent and appropriate relative proportions of alkali and alkaline-earth fluxing agents to yield a substantially neutral slag of high fluidity and thereby obtaining a relatively high yield of tin metal.

4. The method of recovering tin from tin-bearing material which comprises conditioning the material for smelting by a preparatory purification treatment, and smelting the so purified tin-bearing material in the presence of a carbonaceous reducing agent and appropriate relative proportions of alkali and alkaline-earth fluxing agents to yield a slag of high fluidity with a minimum amount of the alkali fluxing agent.

5. The method of recovering tin from tin-bearing material which comprises conditioning the material for smelting by a preparatory purification treatment, briquetting the so purified tin-bearing material admixed with carbonaceous reducing agent and alkali and alkaline-earth fluxing agents, and subjecting said briquetted mixture to a sufficiently high temperature to reduce compounds of tin and yield a slag of high fluidity.

6. The method of recovering tin from tin-bearing material which comprises briquetting the tin-bearing material admixed with carbonaceous reducing agent and sodium and calcium fluxing agents with the calcium fluxing agent present in preponderating amount with respect to the sodium fluxing agent, and subjecting said briquetted mixture to a sufficiently high temperature to reduce compounds of tin and yield a slag of good fluidity.

7. The method of recovering tin from tin-bearing material which comprises conditioning, the material for smelting by a preparatory purification treatment, briquetting the so purified tin-bearing material admixed with carbonaceous reducing agent and alkali and alkaline-earth fluxing agents, with the alkaline-earth fluxing agent present in preponderating amount with respect to the alkali fluxing agent, and subjecting said briquetted mixture to a sufficiently high temperature to reduce compounds of tin and yield a slag of good fluidity.

8. The method of recovering tin from tin-bearing material which comprises converting substantially all of the objectionable impurities in the tin-bearing material into soluble compounds and breaking up complex silicates present therein by subjecting the material in a finely divided state and at an elevated temperature to the action of concentrated sulfuric acid, removing said soluble compounds from the tin-bearing material by a leaching operation, and smelting the so purified tin-bearing material in the presence of appropriate amounts and compositions of reducing and fluxing agents to yield a high recovery of tin metal and a slag of good fluidity.

9. The method of recovering tin from tin-bearing material which comprises subjecting the material to a two-stage treatment in the first stage of which the material is conditioned for reduction by preparatory purification involving treatment of the material with acid at an elevated temperature followed by leaching of the so treated material with a saline solution whereby a substantial elimination of iron is effected and in the second stage of which the so purified tin-bearing material is subjected to a reducing operation.

10. The method of recovering tin from tin-bearing material which comprises subjecting the material to a two-stage treatment in the first stage of which the material is conditioned for reduction by preparatory purification involving treatment of the material with acid at an elevated temperature followed by successive leaching with a saline solution and an alkaline solution whereby substantial elimination of iron and tungsten is effected and in the second stage of which the so purified tin-bearing material is subjected to a reducing operation.

11. The method of recovering tin from tin-bearing material which comprises subjecting the material to a two-stage treatment in the first stage of which the material is conditioned for reduction by preparatory purification involving treatment of the material with sulfuric acid at an elevated temperature followed by successive leachings with a saline solution and an alkaline solution whereby the sintering temperature of the material is raised and substantial elimination of iron and tungsten is effected and in the second stage of which the so purified tin-bearing material is subjected to a reducing operation.

12. The method of recovering tin from tin-bearing material which comprises subjecting the material to a two-stage treatment in the first stage of which the material is subjected to a preparatory purification treatment whereby a substantial elimination of iron is effected and in the second stage of which the so purified tin-bearing material is subjected to a smelting operation with a combination of alkali and alkaline-earth fluxing agents capable of producing a fluid slag at the prevailing temperature of tin reduction.

13. The method of recovering tin from tin-bearing material which comprises subjecting the material to a two-stage treatment in the first stage of which the material is subjected to a preparatory purification treatment whereby a substantial elimination of iron is effected and in the second stage of which the so purified tin-bearing material is subjected to a smelting operation with a combination of alkali and alkaline-earth fluxing agents of which the amount of the alkaline-earth agent employed is largely in excess of the amount of alkali agent employed.

14. The method of recovering tin from tin-bearing material which comprises subjecting the material to a two-stage treatment in the first stage of which the material is subjected to a preparatory purification treatment whereby a substantial elimination of iron is effected and in the second stage of which the so purified tin-bearing material is subjected to a smelting operation with a combination of alkali and alkaline-earth fluxing agents of which the relative amounts employed (with respect to the alkali oxide and alkaline-earth oxide) are approximately in the ratio of one to four respectively.

15. The method of recovering tin from tin-bearing material which comprises converting substantially all of the objectionable impurities in the tin-bearing material into soluble compounds and breaking up complex silicates present therein by subjecting the material in a finely divided state and at an elevated temperature to the action of an acid, removing said soluble compounds from the tin-bearing material by a leaching operation, and smelting the so purified tin-bearing material in the presence of appropriate amounts and compositions of reducing and fluxing agents to yield a high recovery of tin metal and a slag of good fluidity.

16. The method of recovering tin from tin-bearing material which comprises subjecting the material to the action of a concentrated acid at an elevated temperature to convert insoluble iron compounds contained therein to a soluble form, leaching the thus treated material to remove the soluble iron compounds, and smelting the resulting material in the presence of a carbonaceous reducing agent and appropriate amounts of alkali and alkaline-earth fluxing agents to produce a fluid slag in the absence of iron.

17. The method of recovering tin from tin-bearing material which comprises subjecting the material to the action of concentrated sulphuric acid at an elevated temperature to convert insoluble iron compounds contained therein to a soluble form, leaching the thus treated material with a saline solution to remove the soluble iron compounds, and smelting the resulting material in the presence of a carbonaceous reducing agent and appropriate amounts of alkali and alkaline-earth fluxing agents to produce a fluid slag in the absence if iron.

18. The method of recovering tin from tin-bearing material which comprises subjecting the material to the action of a concentrated acid at an elevated temperature to convert insoluble iron and tungsten compounds contained therein to soluble forms, leaching the thus treated material successively with saline and alkaline solutions to remove the soluble iron and tungsten compounds, and smelting the resulting material in the presence of a carbonaceous reducing agent and appropriate amounts of alkali and alkaline-earth fluxing agents to produce a fluid slag in the absence if iron.

19. The method of recovering tin from tin-bearing material which comprises subjecting the material to the action of concentrated sulphuric acid at an elevated temperature to convert insoluble iron and tungsten compounds contained therein to soluble forms, leaching the thus treated material successively with saline and alkaline solutions to remove the soluble iron and tungsten compounds, and smelting the resulting material in the presence of a carbonaceous reducing agent and appropriate amounts of alkali and alkaline-earth fluxing agents to produce a fluid slag in the absence of iron.

In testimony whereof I affix my signature.

PRESTON ROBINSON.